May 7, 1968  J. LACOUR ET AL  3,382,365
APPARATUS FOR MEASURING THE HALF VALUE OF A CURRENT
WITH A SUBSTANTIALLY EXPONENTIAL VARIATION
Filed March 30, 1964  3 Sheets-Sheet 1
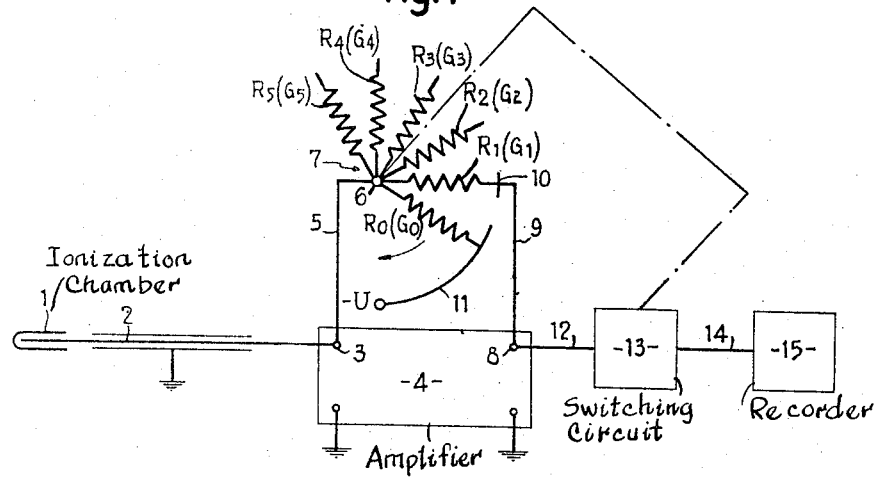
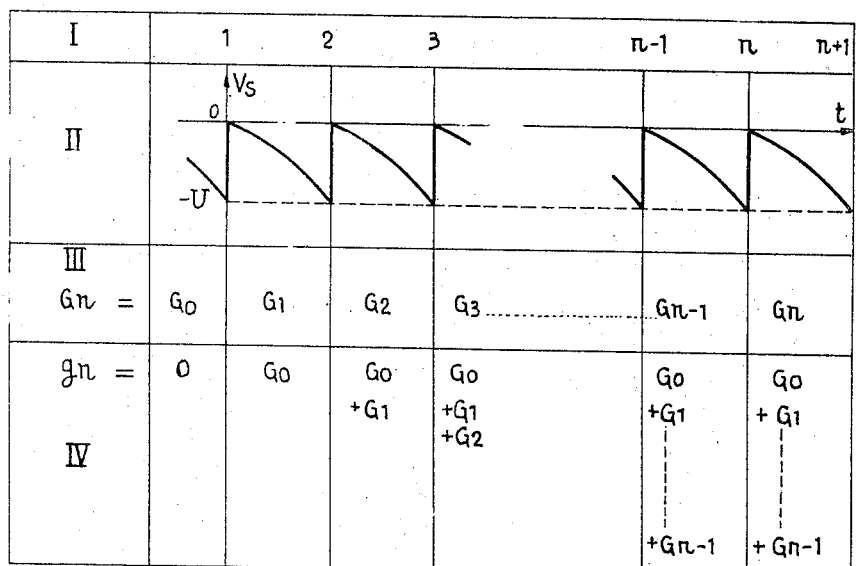

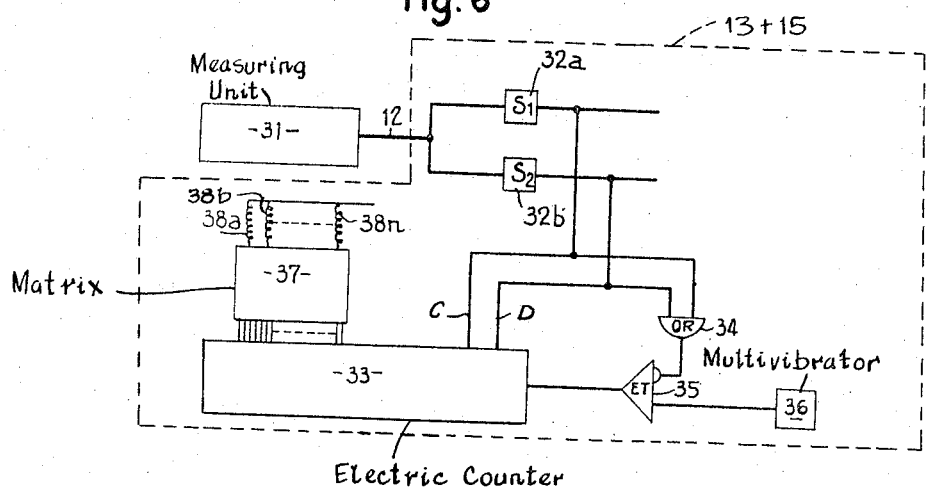
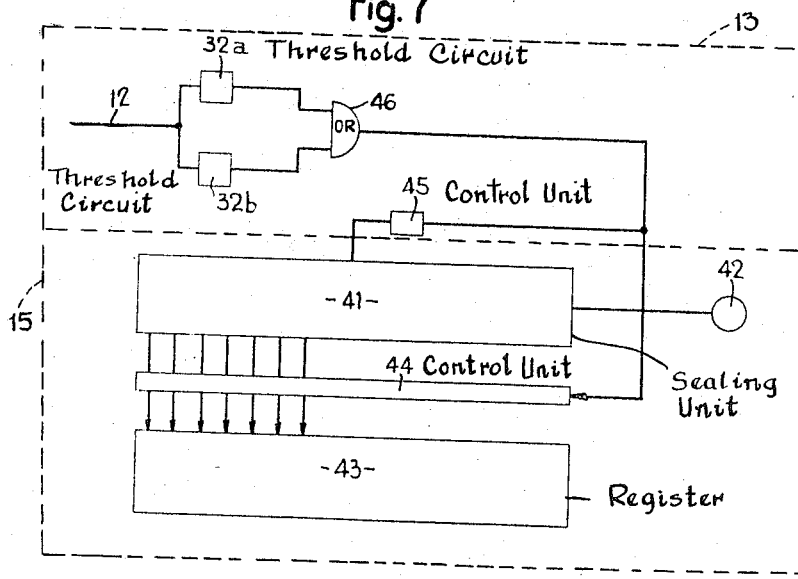

United States Patent Office 3,382,365
Patented May 7, 1968

3,382,365
APPARATUS FOR MEASURING THE HALF VALUE OF A CURRENT WITH A SUBSTANTIALLY EXPONENTIAL VARIATION
Jacques Lacour, Robert Poujois, and Maurice Thuilierc, Grenoble, France, assignors to Commissariat à l'Energie Atomique, Paris, France
Filed Mar. 30, 1964, Ser. No. 355,739
Claims priority, application France, Apr. 2, 1963, 930,117
7 Claims. (Cl. 250—83.6)

The present invention relates to methods and apparatus for measuring the time constant of a current or of a voltage having an exponential variation and is particularly adapted for the measurement of current corresponding to the half value period or to the doubling time of the power of a nuclear reactor.

The method of measurement of the doubling time or halving time of a quantity which has a substantially exponential variation in accordance with the invention is characterized in that a current which is proportional to the present quantity to be measured is applied to the input of a system of which the essential element is a negative feedback amplifier having a high input resistance, and is further characterized in that (a) In the first case (measurement of the doubling time) the connections between the elements of the system which is associated with the said amplifier and the amplifier itself are changed so as to reduce to zero the voltage produced by said amplifier when said voltage reaches a certain value, and in that a measurement is taken of the time which elapses between the periods in which the voltage produced by the amplifier is restored to said value, whereas (b) In the second case (measurement of the halving-time) the connections between the elements of the system which is associated with said amplifier and the amplifier itself are changed when the voltage produced by said amplifier is reduced to zero in such a manner that said voltage is thus restored to a predetermined value, and in that a measurement is taken of the time which elapses between the periods in which the voltage produced by the amplifier is reduced to zero.

In accordance with the present invention, there is provided apparatus for effecting the desired measurement which comprises an operational amplifier having applied to its input a current which is proportional to the quantity to be measured. A network of resistors is provided and adapted to be selectively switched across the input and output of the operational amplifier to vary the input current of the amplifier. The resistor network is switched when the output voltage of the amplifier reaches a predetermined value and switching of the resistor network causes the output voltage to change to a second predetermined value, after which it returns to the first predetermined value. As the output voltage is restored to the first predetermined value, the time which elapses is measured and this measurement is used to provide an indication of the half value period.

A further object of the invention is to provide an equipment unit for the practical application of the above method, and is accordingly characterized in that a current which is proportional to the quantity to be measured is applied to that input terminal of the amplifier which is not conected to ground (earth), in that the elements which are associated with said amplifier so as to constitute the system are formed of a series of $(n+1)$ resistors of which the first has a given conductance $G_0$ whilst the $n$ remaining resistors have as conductance value the $n$ first terms of a geometrical progression having a common ratio of 2 and a first term $G_0$, one of the ends of each of said $(n+1)$ resistors being connected to said amplifier input terminal, one resistor in the range $i$ being designed to constitute a feedback channel of said amplifier whilst the second end of each resistor in a range which is lower than $i$ is connected to a terminal having a given fixed potential $-U$ and the second end of each resistor in a range which is higher than $i$ is not connected, in that said amplifier is connected to a time-measuring device by means of an element for transmitting and switching said system when the voltage produced by the amplifier is equal either to the value $-U$ (measurement of the doubling time) or to th value 0 (measurement of the halving-time).

In order to compensate for the lack of precision of the resistors which are employed in this equipment unit, that output terminal which is not connected to the frame of the amplifier is grounded (earthed) through a resistor fitted with a sliding contact to which is connected the resistor which constitutes the feedback channel of the amplifier.

In the case in which the aforesaid equipment unit is applied to the measurement of the doubling time of the power of a nuclear reactor, the current which is proportional to this power is produced by an ionization chamber.

Further characteristics of the invention and the advantages provided by this latter will be brought out in the description which now follows.

In the accompanying drawings:

FIG. 1 is a diagrammatic view of a measuring unit in accordance with the invention;

FIG. 2 is a table in which is shown a curve of the output voltage of the amplifier during the switching operations with indication of the values of conductance which are employed;

FIG. 6 is a diagram of one example of a switching change-over circuits as designed for use in said equipment unit;

FIG. 7 is a diagram of one example of a time-measuring circuit as designed for use in said equipment unit.

Figure 3A:
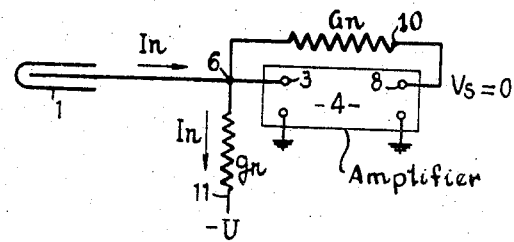
FIGS. 3A and 3B are two diagrams of the measuring unit which explain the operation of this device between two switching operations.
Figure 3B:
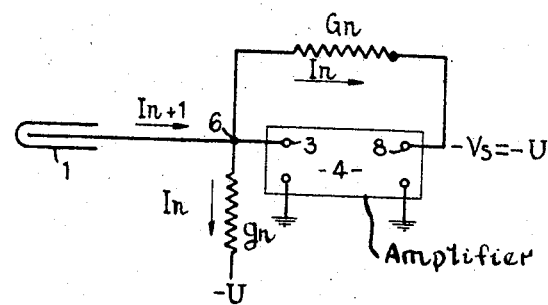

In accordance with the form of embodiment which is represented in FIG. 1, an equipment unit for measuring the doubling time of an exponentially variable process comprises a source producing a current which is proportional to the value which is measured in the case, as in the present instance, in which the device is applied to the measurement of the power doubling time of a nuclear reactor, the said source being a compensated ion chamber 1 whose current is assumed to be proportional to the power of the reactor and which is connected by means of a coaxial cable 2 to the input 3 of a linear amplifier 4 with input electrometer tube (valve) and having a high gain which is greater than 5,000, for example.

The input 3 of the aforesaid amplifier is connected by a lead 5 to the center 6 of a "star" 7 constituted by $(n+1)$ resistors $R_0, R_1, R_2 \ldots R_n$. In the figure, the number $n$ has been limited to 5 but in practice, said number $n$ is higher than this figure and can be of the order of several tens.

The conductances of these resistors have the following values:

$$G_0$$
$$G_1 = G_0$$
$$G_2 = 2G_0$$
$$G_k = 2^{k-1}G_0$$
$$G_n = 2^{n-1}G_0$$

It will be noted that the conductances of the last resistors constitute the $n$ first terms of a geomerical progression having a common ratio of 2 and a first term $G_0$.

A simple calculation on the basis of the $(n+1)$ equations given above shows that the conductance $G_k$ is equal to the sum of the conductances of the resistors of lower range namely $G_1$ to $G_{k-1}$. In other words, the conductance of a resistor in the range $j$ is equal to the total conductance of the lower-range resistors connected together in parallel.

The output 8 of the amplifier is connected through a lead 9 to a point 10 with which each resistor comes into contact in turn, whilst the lower-range resistors come into contact with a conductive element 11 having the shape of a circular arc with a centre 6 which is connected to a terminal of a voltage source which is brought to the potential $-U$. In the figure, the resistance $R_0$ is connected between the point 6 and the element 11, that is to say between the input of the amplifier and the element which is at the potential $-U$, whilst the resistor $R_1$ is connected between the points 6 and 10, that is to say between the input and the output of the amplifier.

As will be apparent, the contact member 11 which successively connects the resistances in parallel between the point 6 and the point which is at the potential $-U$ can be replaced by any switching device which serves to achieve the same result. The member 11 constitutes a diagrammatic presentation of the switching system which can in fact be designed in very different forms; in particular, the switch-over operations can be carried out by means of high-insulation relays, each relay being capable of switching only a single resistor.

The number of possible alternative forms are within the capacity of anyone versed in the art and it does not therefore appear necessary to dwell on these latter in detail.

Finally, the amplifier is connected to a switching device 13 which is in turn coupled to a time-interval measuring device 15.

In a general manner, the aforesaid measuring device operates as follows:

At the commencement of criticality of a nuclear reactor, the free end of the conductance $G_0$ is coupled with the output of the amplifier. When the output voltage $V_s$ of the amplifier becomes higher than a value $-U$ of the order of $(-10$ v.$)$, the switching device 13 connects:

(a) The conductance $G_0$ to the element 11 which is maintained at the fixed potential having a value $-U$, (b) The conductance $G_1$ to the point 10, that is to say to the output of the amplifier.

At the $n^{th}$ switching action, the conductance $G_n$ replaces the conductance $G_{n-1}$ between the terminals 3 and 8 of the amplifier, all the conductances of lower order from $G_0$ to $G_{n-1}$ inclusive being coupled to the member 11 having a fixed potential $-U$, this group of parallel-connected resistors having a conductance $g_n = G_n$.

The table of FIG. 2 illustrates the different phases of this operation.

In this table, the first horizontal division indicates the moments of the successive $(n+1)$ switching operations as numbered from 1 to $n+1$.

The second horizontal division is a graph which represents the variations in the output voltage $V_s$ of the amplifier as a function of time; each time this voltage $V_s$ reaches the value $-U$, there takes place a switch-over which reduces the value of said voltage $V_s$ to zero, whereupon said voltage again rises, in absolute value, during the new period.

The third horizontal division indicates in respect of each period the reference of the conductance $G_k$ of the resistor which is connected in shunt with the amplifier.

The fourth horizontal division indicates the references of the groups of conductances $G_0$ to $G_{k-1}$ of the resistors which are conected in parallel between the input of the amplifier and the point having a potential $-U$ during each period; after any switch-over, namely the number $k$ in the series, the conductances $G_0$ to $G_{k-1}$ are thus connected in parallel and their total conductance $g_k$ is equal to the value of the conductance $G_k$ which is shunted on the amplifier.

FIG. 3A shows the state of the system of resistors at the commencement of the $n^{th}$ measurement operation, that is to say immediately after the $n^{th}$ switch-over, $G_n$ having just been switched in shunt on the amplifier whereas $G_{n-1}$ has just been switched-over to the lead 11; all the conductances $G_0$ to $G_{n-1}$ which are thus connected in parallel are generally designated in the diagram by the reference $g_n$.

The current $I_{ch}$ of the chamber is accordingly equal to $2UG_{n-1}$, that is to say, to $UG_n$; the said current is completely absorbed by $g_n$ and is therefore represented by the current $I_n$ (FIG. 3A), the output voltage is therefore zero, as shown in FIG. 2.

At the end of the $n^{th}$ period, the current $I_{ch}$ progressively increases to the value $2UG_n = 2I_n = I_{n+1}$. The absolute value of the output voltage will again increase to $-U$ and the switch-over device will be actuated.

If it is assumed that the device comprises a resistor of serial number $n+1$, a further switching action takes place and a further period of measurement follows the period of the $n$ range.

The output voltage therefore effectively ranges from 0 to $-U$ as shown by curve II of FIG. 2.

The time which elapses between two changes of range corresponds to the doubling time of the chamber current and therefore to the reactor power doubling time.

The successive switching operations are effected by the range-changing switch 13 and the time intervals between the changes of range are measured by the time-measuring device 15; examples of these devices will be described below.

In the foregoing description, it has been assumed that the values of the resistances $R_0$ to $R_n$ . . . were strictly equal to their theoretical values. In practice, this condition cannot be satisfied and it is necessary to make provision for a regulating element in the case of each of the resistors which are employed.

Figure 4:
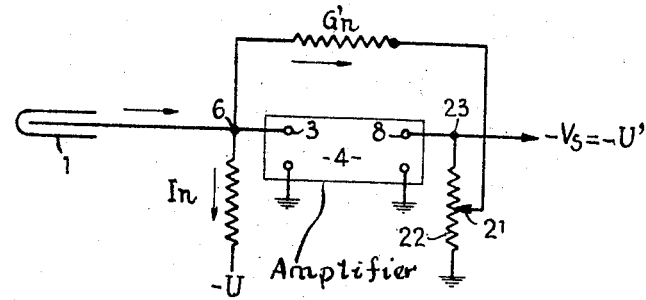
FIG. 4 is a diagram which is similar to FIG. 3B and relates to an alternative form of the invention.

To this end, as can be seen from FIG. 4, the resistor which is connected in parallel with the amplifier is connected on the output side of said amplifier to the sliding contact 21 of a potentiometer 22, the terminal 23 of which is connected to the output 8. The said potentiometer has a high resistance value which may be of 100 kilohms, for example.

This device produces action in the following manner.

It will be assumed, for example, that the operation reaches the end of the $n^{th}$ measuring stage when the chamber delivers a current $I_{n+1} = 2I_n$. If $G_n$ is too high, the output voltages will not attain the value $-U$ and the switching device will not be actuated. But by adjusting the position of the sliding contact 21, it is then possible to adjust the output voltage to the value $-U$ which is required in order to initiate a change of range.

In point of fact, one potentiometer is permanently associated with each resistor and the switch-over operations are effected at the level of the terminals 23 of said potentiometers.

Figure 5:
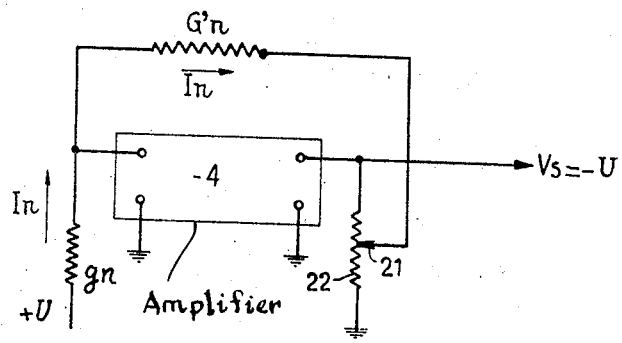
FIG. 5 is an explanatory diagram of the mode of calibration of the measuring unit.

Each potentiometer can be calibrated very simply by disconnecting it from the ionization chamber and by bringing the member 11 not to a potential $-U$ but to a potential $+U$. The circuit arrangement shown in FIG. 5 is thus obtained. The calibration is accordingly performed in the following manner:

It will be assumed that the apparatus is brought to the state which corresponds to the $n^{th}$ measurement and that all the conductances have been adjusted by means of their respective potentiometers. The value of $g_n$ is therefore adjusted and will therefore supply to the amplifier input a current $I_n = Ug_n$ (as shown in FIG. 5).

If the calibration is correctly performed, this current which passes into $G_n'$ should develop at the amplifier output a voltage which is equal to —U. Should this not be the case, the output voltage is added to this value by means of the rheostat which corresponds to the conductance $G_n'$.

It can be seen that, by starting from the position which corresponds to the first measurement, the whole apparatus can be calibrated at successive points. This calibration requires only a single operation per doubling period.

The invention is not limited to the use of a switching device 13 of any particular type; it is accordingly possible, for example, to employ the device which is illustrated diagrammatically in FIG. 6.

In this figure, the rectangle 31 represents the unit as a whole which comprises the ionization chamber 1, the amplifier 4 and its set of resistors and the circuits which make up switching device 13 and time measuring device 15 of FIG. 1 are enclosed within dash lines.

The references 32a, 32b designate threshold circuits $S_1$ and $S_2$ which are connected in parallel at the output of the amplifier. The circuit 32a trips when the output voltage becomes smaller than —U and the circuit 32b trips when said voltage becomes higher than zero.

The two threshold circuits $S_1$ and $S_2$ control respectively an electronic counter 33 in such a manner that this latter counts up and counts down (in ascending and descending order of magnitude).

If any one of the threshold values $S_1$ and $S_2$ is exceeded, an OR-circuit 34 opens an electronic gate 35 which establishes a connection between a 10 c./s. multivibrator 36 and the counter 33.

The position of the triggers of said counter is decoded by a matrix 37, the outputs of which are connected to the high-insulation relay coils 38a, 38b . . . which control the switching of the resistors $R_0$ . . . $R_n$ as long as the output voltage is not comprised within the interval 0 to —U.

This range-changing device operates either during build-up or decrease in reactor power, and the star of resistors accordingly rotates either in one direction or the other.

The invention is not limited to the use of a time-measuring device of any particular type. It is accordingly possible to employ, for example, the device which is represented diagrammatically in FIG. 7. The measurement to be effected is that of the time intervals between the successive switch-over operations as defined by the trigger action of the threshold circuit 32a during reactor power build-up and of the threshold circuit 32b during decrease in reactor power.

A scaling unit 41 is actuated by a time base 42 which, depending on the range which is adopted, can be either 1 c./s., 100 c./s. or 10 c./s. With this scaling unit are associated a register 43, a control unit 44 for transferring the count recorded by the scaler 41 to the register 43, and a control circuit 45 for resetting the scaler 41 to zero with a slight delay, the control units 44 and 45 being coupled with the circuits 32a, 32b by means of an OR-gate 46.

When a threshold circuit 32a or 32b changes over, the count recorded by the scaler 41 is transferred into the register 43 and the scaler is then reset to zero. The time which is necessary for the transfer and resetting can be considered as negligible (of the order of 10 microseconds, for example). After the transfer has taken place, the measurement $n-1$ is contained within the register whereas the scaler immediately resumes the counting process in order to carry out the measurement $n$. During this further measurement, the measurement $n-1$ can be imparted by the register to a printing machine.

It is apparent that the measuring apparatus in accordance with the invention confers a number of advantages, in particular the following:

The dynamic capacity of the apparatus can be as high as may be desired. The number of doubling periods can be substantial, for example 20 or even higher;

The utilization of the high-gain operational amplifier permits the possibility, by virtue of the very small voltage excursions at the amplifier input, to reduce to a very low value the limitations caused by the stray capacitance of the connecting cable to the chamber (response time) and by its insulation resistance (minimum chamber-current carrying capacity).

This apparatus can be very readily calibrated and without ancillary equipment.

The invention is not limited to the forms of embodiment which have been illustrated and described and which have been chosen solely by way of example.

In particular, the range-changing switching device and time-measuring device can be of any type which is suited to the functions performed by these devices in the doubling-time measuring device in accordance with the invention.

It will also be understood that the measuring device in accordance with the invention is applicable to the measurement of the doubling time of any process of exponential character, the application to a reactor having been chosen solely by way of example.

For instance, it will be apparent from the foregoing description that, since the measuring device is capable of operating in the direction of decrease in the exponential process, said device can also be employed for the purpose of following the process of decay of radio-active substances.

The process to be studied by means of the device can be of any nature, whether electrical, thermal, mechanical, chemical and so forth.

What we claim is.

1. Apparatus for measuring the time constant of a current or a voltage having an exponential variation comprising, an amplifier having an input and an output, means for applying to said input a current corresponding to the quantity to be measured, a resistance network comprising a series of $(n+1)$ resistors of which the first has a given conductance $G_0$ and the $n$ remaining resistors have as their conductance value the $n$ first terms of a geometrical progression having a common ratio of 2 and a first term $G_0$, one of the ends of each of said $(n+1)$ resistors being connected in common to said amplifier input, and means for connecting the other end of a resistor in a range $i$ to the output of said amplifier and in parallel therewith and the other end of each of said resistors in a range which is lower than $i$ to a terminal having a fixed potential while the other end of each of said resistors in a range which is higher than $i$ is not connected.

2. Apparatus for measuring the time constant of a current or a voltage having an exponential variation as set forth in claim 1 wherein said means for connecting the other end of the resistors is arranged to modify the connections of the resistance network to vary the quantity of current traversing the input of the amplifier, when the voltage of the output of the amplifier attains a first predetermined value, to cause the output voltage of the amplifier to change to a second predetermined value and measure the duration of the time which elapses until the output voltage of the amplifier regains said first predetermined value.

3. Apparatus for measuring the time constant of a current or a voltage having an increasing exponential variation as set forth in claim 1, wherein said means for connecting the other end of the resistors is arranged to vary the intensity of the current applied to the input of the amplifier, when the voltage of the output attains a first predetermined value, so as to cause said output voltage to reach a second predetermined value and measure the time which elapses until the voltage produced by the amplifier regains said first predetermined value.

4. Apparatus as defined in claim 3 wherein said means for connecting the other end of the resistors includes a pair of threshold circuits, one of said circuits being arranged to be tripped when the voltage at the output amplifier is smaller than the first predetermined value (time constant measuring of a current having an increasing exponential variation), the other of said circuits being arranged to be tripped when the voltage at the output terminal of the amplifier is greater than zero (time constant measuring of a current having a decreasing exponential variation) and means responsive to the tripping of said threshold circuits for changing the range connection for said resistors.

5. Apparatus for measuring the time constant of a quantity having an increasing exponential variation and of a quantity having a decreasing exponential variation comprising, an operational amplifier having an input and an output, means for applying to said input a current proportional to the quantity to be measured, a series of $(n+1)$ resistors of which the first has a given conductance $G_0$ and the $n$ remaining resistors have as their conductance value the $n$ first terms of a geometrical progression having a common ratio of 2 and a first term $G_0$, one of the ends of each of said $(n+1)$ resistors being connected to said amplifier input, a terminal having a fixed potential, one resistor in a range $i$ having its other end connected to the output of said amplifier and in parallel therewith while the other end of each of said resistors in a range which is lower than $i$ is connected to said terminal and the other end of each of said resistors in a range which is higher than $i$ is not connected, and means for controlling the connection of the other end of each of said resistors to said terminal and to the output of said amplifier, said means including a transmission member adapted to be actuated when the voltage produced by said amplifier at the output terminal is equal either to a value corresponding to the time constant of the quantity having an increasing exponential variation or to a value corresponding to the time constant of the quantity having a decreasing exponential variation.

6. Apparatus as defined in claim 5 wherein said transmission member comprises two threshold circuits connected in parallel at the output of the amplifier, one of said circuits being arranged to be tripped when the voltage of the amplifier is smaller than the first predetermined value (time constant measuring of a current having an increasing exponential value), the other of said circuits being arranged to be tripped when the voltage of the amplifier is greater than zero (time constant measuring of a current having a decreasing exponential variation), a gate circuit, means connecting the outputs of said threshold circuits to said gate circuit, a counting unit, means for applying the output of said gate to said counting unit, and switching relays energized by said counting unit for controlling the connection of said resistors.

7. Apparatus as defined in claim 5 wherein the quantity corresponds to the half-value period of a nuclear reactor and said means for applying current to said input includes an ionization chamber producing a current proportional to said half-value period.

References Cited
UNITED STATES PATENTS

| | | | |
|---|---|---|---|
| 3,019,426 | 1/1962 | Gilbert | 234—154 X |
| 3,069,545 | 12/1962 | Lide et al. | 250—83.1 |
| 3,230,370 | 1/1966 | Deans et al. | 250—43.5 |
| 3,242,337 | 3/1966 | Mackenzie et al. | 250—71.5 X |

RALPH G. NILSON, *Primary Examiner.*

A. B. CROFT, *Assistant Examiner.*